United States Patent [19]

Munoz

[11] Patent Number: 4,863,197
[45] Date of Patent: Sep. 5, 1989

[54] HIGH-PRESSURE END FITTING

[75] Inventor: Jose P. Munoz, Joplin, Mo.

[73] Assignee: Ingersol-Rand Company, Woodcliff Lake, N.J.

[21] Appl. No.: 335,565

[22] Filed: Apr. 10, 1989

Related U.S. Application Data

[63] Continuation of Ser. No. 163,489, Mar. 3, 1988, abandoned.

[51] Int. Cl.⁴ .............................................. F16L 33/20
[52] U.S. Cl. ...................................... 285/14; 285/256
[58] Field of Search .................... 285/14, 13, 256, 259

[56] References Cited

U.S. PATENT DOCUMENTS

| 1,926,270 | 9/1933 | Eastman | 285/256 |
|---|---|---|---|
| 2,177,095 | 10/1939 | Cowles | 285/256 |
| 2,485,976 | 10/1949 | Main | 285/256 X |
| 3,115,353 | 12/1963 | Previati | 285/14 |
| 3,167,331 | 1/1965 | Marshall | 285/14 X |
| 4,123,088 | 10/1978 | Tanaka | 285/14 |
| 4,422,675 | 12/1983 | Norris et al. | 285/14 X |

FOREIGN PATENT DOCUMENTS

| 1169737 | 5/1964 | Fed. Rep. of Germany | 285/256 |
|---|---|---|---|
| 1247774 | 8/1967 | Fed. Rep. of Germany | 285/256 |
| 820140 | 11/1937 | France | 285/256 |
| 1014789 | 8/1952 | France | 285/256 |
| 1030485 | 5/1966 | United Kingdom | 285/256 |

Primary Examiner—Thomas F. Callaghan
Attorney, Agent, or Firm—James R. Bell

[57] ABSTRACT

The fitting terminates an end of a high-pressure hose and comprises a coupling having a portion thereof inserted in the hose end, and a sleeve, enveloping both the hose end and the coupling inserted portion, crimped onto the hose end. A void obtains within the sleeve at the end of the hose, and a capillary hole formed in the sleeve (and in a circumferential wall of the coupling) communicates the void with the external surface of the sleeve. The hole, a weep hole, safely relieves fluid leakage or seepage from the void.

3 Claims, 1 Drawing Sheet

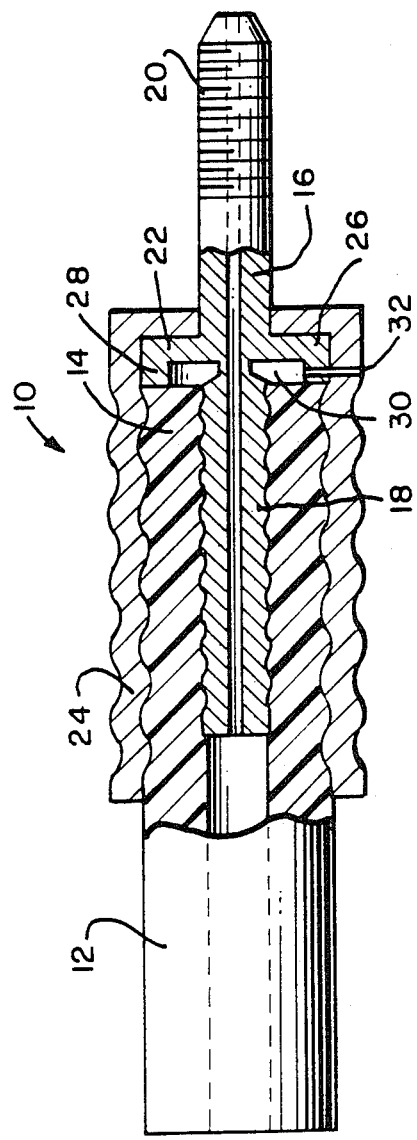

HIGH-PRESSURE END FITTING

This is a continuation of application Ser. No. 163,489 filed Mar. 3, 1988, now abandoned.

This invention pertains to connectors and couplings for high-pressure hoses, and the like, and in particular, to a high-pressure hose end fitting.

Fittings of the type to which the invention pertains commonly have a sleeve crimped onto the end of a hose, the end having a ribbed limb of a hose coupling therein.

Ordinarily, when fluid passes through the fitting, nothing untoward occurs. However, if the fluid conduct is diminished, or halted, at some point upstream, the static fluid pressure in the coupling endeavors to find a leak path. If the fluid, as is frequently the case, can insinuate itself between the sleeve and the hose end, then the sleeve can rupture, or it simply can lose its crimped grip on the hose and come free.

It is an object of this invention to set forth an improved high-pressure hose end fitting which will largely obviate the problems, just noted, which prior art fittings experience.

Particularly, is it an object of this invention to disclose a high-pressure hose end fitting, comprising a hose having a terminal end; a hose coupling; and a crimp sleeve; wherein said coupling has a first hose-receiving limb, a second external-connection limb, and an annular land intermediate said limbs; said first limb is confined in said terminal end of said hose; said first limb and said terminal end of said hose are confined within said crimp sleeve, and said crimp sleeve is crimped on said end of said hose; and said land and said end of said hose have spaced-apart surfaces which define a void therebetween; and further including means for communicating said void with an external surface of said sleeve.

Further objects of this invention, as well as the novel features thereof, will become more apparent by reference to the following description taken in conjunction with the accompanying FIGURE which is a longitudinal cross-sectional view of a high-pressure hose end fitting according to an embodiment of the invention.

As shown in the FIGURE, the fitting 10 comprises a portion of hose 12 having a terminal end 14, and a hose coupling 16. Coupling 16 has a first, ribbed, hose-receiving limb 18, at one end, a second, external-connection limb 20 at the opposite end, and a land element 22 intermediate the limbs 18 and 20. A sleeve 24 encloses both the hose end 14 and the limb 18, and is crimped onto the end 14.

The land element 22 has a flat or planar portion 26 and a circumferential wall 28 about the periphery of portion 26. The wall 28 is nested in the sleeve 24. Between planar portion 26 and the end 14 of the hose 12, there subsists a void 30. If leakage or seepage fluid under pressure reaches void 30, and insinuates itself between the hose end 14 and wall 28, and then between the end 14 and the sleeve 24, it could cause the sleeve to fracture, or so loosen the sleeve on the hose that it could come free.

According to my invention, a capillary hole 32 is formed through both the wall 28 and the sleeve 24 to relieve any built-up, static, fluid pressure. The hole 32 provides a controlled, directed leakage in order that the integrity of the fitting is not put at risk.

While I have described my invention in connection with a specific embodiment thereof, it is to be clearly understood that this is done only by way of example, and not as a limitation to the scope of my invention, as set forth in the objects thereof and in the appended claims.

I claim:
1. A high-pressure hose end fitting, comprising:
a hose having a terminal end;
a hose coupling inserted in said terminal end;
a crimp sleeve mounted on said terminal end;
said coupling has a first hose-receiving limb, a second external-connection limb, and a radially extending annular land intermediate said limbs;
said first limb being engaged with an inner circumferential surface of said hose to form an interface therewith at said terminal end of said hose;
said first limb and said terminal end of said hose are confined within said crimp sleeve, and said crimp sleeve is crimped on said end of said hose;
said land including a circumferential wall axially extending therefrom and abutting said terminal end;
said land and said interface being spaced-apart by said circumferential wall to define a void therebetween; and
means for communicating said void with an external surface of said sleeve.

2. A high-pressure hose end fitting, according to claim 1, wherein;
said communicating means comprises a capillary hole formed through said sleeve and said wall and opening into said void, whereby fluid leakage at said interface is relieved at said void and vented therefrom by said hole.

3. A high pressure hose end fitting, comprising:
a hose having inner and outer circumferential surfaces terminating at a terminal end;
a coupling having a hose receiving limb including a ribbed surface engaged within said inner circumferential surface of said hose to form an interface therewith, said coupling having a radially extending annular land including a circumferential wall axially extending therefrom and abutting said terminal end adjacent said outer circumferential surface, and defining an annular void between said interface and said land; and
a sleeve crimped on said outer circumferential surface, said sleeve enclosing said circumferential wall and said terminal end, said sleeve and said circumferential wall including vent means formed therethrough for venting said annular void, whereby fluid leakage at said interface is relieved at said void and vented therefrom through said vent means.

* * * * *